Figure 1:
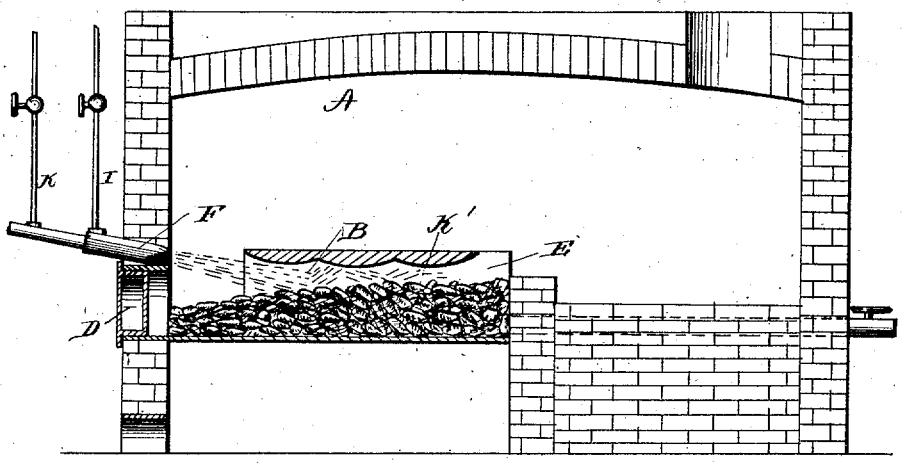

B. SLOPER,

Assignor of one-half to W. M. JACKSON.

Hydrocarbon Furnace.

No. 9,588. Reissued Feb. 22, 1881.

*Witnesses.*
Franck L. Durand
J. J. McCarthy.

*Inventor:*
Byron Sloper
by Chas. S. Coombs
Atty.

UNITED STATES PATENT OFFICE.

BYRON SLOPER, OF NEW YORK, N. Y., ASSIGNOR OF ONE-HALF TO WALTER M. JACKSON, OF PROVIDENCE, RHODE ISLAND.

HYDROCARBON-FURNACE.

SPECIFICATION forming part of Reissued Letters Patent No. 9,583, dated February 22, 1881.

Original No. 236,098, dated December 28, 1880. Application for reissue filed January 28, 1881.

*To all whom it may concern:*

Be it known that I, BYRON SLOPER, a citizen of the United States, residing at New York, in the county of New York and State of New York, have invented certain Improvements in Furnaces; and I hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in hydrocarbon-furnaces—*i. e.*, in the application of vaporized water, with or without liquid or subdivided fuel in connection with solid or porous carbonaceous material for the production of heat—and in apparatus for carrying such improvements into effect.

Heretofore, in the employment of liquid fuel for the production of heat, it has been injected into a furnace by means of steam under pressure and there ignited, the steam serving simply as a medium for its introduction, the heat produced depending entirely upon the consumption of the liquid fuel. When thus applied the carbon of the fuel, being simply burned by uniting with the atmospheric air in a cold state, carried into the furnace by the natural draft, produces a white flame of comparatively small heating capacity, and the steam passes off undecomposed, and its valuable gaseous constituents are not utilized.

I have discovered, by practical experience, an improved method in which the gaseous constituents of steam can be utilized by decomposing the steam and burning the resultant gases, either alone or in conjunction with liquid or subdivided fuel, which gases consist, principally, of pure hydrogen and carbonic oxide, the latter being an inflammable gas, generated by the union of the steam with the carbon of the fuel, and a valuable heating agent. To accomplish this result, however, I have found it absolutely necessary to modify the existing furnaces, and to effect the decomposition by bringing the vaporized water or steam into intimate contact with solid or porous carbonaceous material, at an intense white heat, in a decomposing-retort and combustion-chamber, as will be more fully hereinafter specified. When the steam is thus decomposed, and the resultant gases are burned in conjunction with the liquid or subdivided fuel, I have found that the combustion of such fuel is not only complete, but that the heat is greatly intensified and the consumption of the fuel largely reduced, owing to the instantaneous decomposition of the steam and the utilization of the gases arising therefrom.

Throughout the present specification I refer to solid or porous carbonaceous material as a decomposing agent in contradistinction to the liquid or subdivided fuel employed, and by such solid or porous carbonaceous material I mean either coal, coke, charcoal, or other similar material, whether compact, such as coal, or porous, such as charcoal, coke, or the like.

My invention consists, first, in the production of heat, of a process of decomposing water by injecting the same, in a vaporized condition, either with or without the admixture of either liquid or subdivided fuel, into or upon solid or porous carbonaceous material located in a combined decomposing-retort and combustion-chamber, and constructed for the purpose, whereby mutual decomposition of the water and fuel into hydrogen and carbonic oxide is effected by causing the vaporized water, either alone or in conjunction with the liquid or subdivided fuel, to "hug" the surface of the solid carbonaceous material and be brought into intimate contact with the same, substantially as specified; second, in a process of burning liquid or subdivided fuel, in conjunction with the gases resulting from the decomposition of water, by atomizing and injecting such fuel, together with a current of steam, upon a bed of solid or porous carbonaceous material heated to an intense white heat in a suitable combined decomposing-retort and combustion-chamber, whereby the mutual decomposition of the steam and fuel into hydrogen and carbonic oxide is effected by the successive and intimate contact of the steam and the liquid or subdivided fuel upon the solid or porous carbonaceous material in the said combined decomposing-retort and combustion-chamber, and perfect combustion of the resultant gases is effected, and the most intense heat produced, as more fully hereinafter specified; third, in an improved process of burning liquid or subdivided fuel by atomizing and injecting the same by means of a current of steam upon a bed of carbonaceous material heated to an intense white heat in a combined decomposing-retort and combustion-chamber, and causing it, together with the gases generated, to reverberate over or through the solid or porous carbonaceous material, so as to bring it and said gases into intimate contact with successive fresh portions of solid or porous carbonaceous material, as more fully hereinafter set forth; fourth, in a process of burning liquid or subdivided fuel by atomizing and injecting the same upon a bed of solid or porous carbonaceous material heated to an intense white heat in a combined decomposing-retort or combustion-chamber, in conjunction with a current of heated air, and causing the whole to reverberate over the solid or porous carbonaceous material, so as to bring the gases developed into contact with successive fresh portions of solid or porous carbonaceous material, whereby a thorough combustion of the liquid or subdivided fuel is effected and an intense heat produced; fifth, in the combination, in a furnace for burning liquid or subdivided fuel, of a combined decomposing-retort and combustion-chamber, and having its interior provided with a series of deflecting or reverberating surfaces to deflect or reverberate the liquid or subdivided fuel and steam, and the gases arising therefrom, and cause the same to come successively into intimate contact with fresh portions of the solid or porous carbonaceous material; sixth, in the combination, in a furnace for burning liquid or subdivided fuel and decomposing steam, of a decomposing-retort and combustion-chamber, adapted to hold solid or porous carbonaceous material, and provided with a series of reverberating surfaces on its interior, the said combined decomposing-retort and combustion-chamber being made in sections of fire-tiles or other refractory material, whereby it may be located in the furnace without removing the front or any portion of the same, as more fully hereinafter set forth; seventh, in the combination, in a furnace for burning liquid or subdivided fuel, of a decomposing-retort and combustion-chamber and adapted to hold solid or porous carbonaceous material, and provided with a series of reverberating and deflecting surfaces on its interior, and a suitable injector for introducing liquid or subdivided fuel, whereby the gases generated therefrom are caused to hug the surface of the carbonaceous material, as more fully hereinafter specified; eighth, in the combination, in a furnace, of a combined decomposing-retort and combustion-chamber adapted to contain solid or porous carbonaceous material, with an atomizing-injector for injecting liquid or subdivided fuel into said retort and chamber and suitable air-passages, whereby heated air, if necessary, may be introduced into the retort and combustion-chamber, in conjunction with the liquid or subdivided fuel and steam, and caused to reverberate over and hug the solid or porous carbonaceous material for the purpose of completing the combustion and intensifying the heat, as more fully hereinafter set forth; and, ninth, in the combination, with the combined decomposing-retort and combustion-chamber, of an injector whereby atomized or subdivided fuel, in conjunction with a current of steam, may be supplied to said retort and combustion-chamber, as more fully hereinafter set forth.

Figure 2:
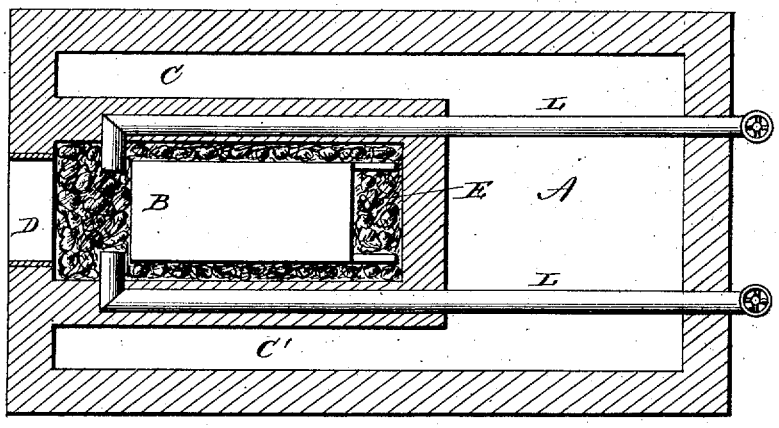
Figure 3:
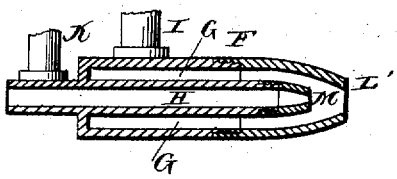

In the drawings, Figure 1 illustrates a longitudinal vertical section of an improved furnace for carrying out my invention. Fig. 2 represents a horizontal section of the same, and Fig. 3 a detached sectional view of my improved injector.

The letter A indicates the furnace, which may be constructed of any suitable material, and which may be of the ordinary or any approved form, according to the different purposes for which the heat may be desired.

The letter B indicates a combined decomposing-retort and combustion-chamber, which may be located in the furnace. This may be constructed of any suitable refractory material. In the present instance it is represented as constructed of fire-tiles and in sections, built up in the central part of the furnace, at the forward end of the same, leaving the heating-spaces C and C′ at each side; but it may be otherwise constructed and located without departing from my invention.

The letter D indicates the door of the furnace, located directly in front of the combined decomposing-retort and combustion-chamber, so that the solid or porous carbonaceous material (indicated by the letter E) can be conveniently charged into said chamber and retort.

The letter F indicates an atomizing-injector, by means of which the liquid or subdivided fuel is introduced. This injector is constructed of cast metal, with the body in one piece, having chambers G and H, provided with suitable pipes I and K, by means of which it can be connected with a suitable steam-generator or liquid or subdivided fuel receptacle or supply-chamber. The said injector is provided with detachable screw-nozzles L′ M, which have their walls in parallel conical planes, when in place, and which can be adjusted, by means of suitable washers interposed between them and the seat on the body of the injector, so as to vary the relative distance between their respective openings, in order to regulate the injection of the liquid or subdivided fuel. One or more of said injectors may be employed, as occasion requires, and said injector or injectors may be located just in front of the furnace, projecting through a suitable aperture or apertures in the same, in a line about on a level with the top of the combined decomposing-retort and combustion-chamber, so as to project the liquid or subdivided fuel against the first of a series of deflecting or reverberating surfaces, and from such directly into the body of the solid or porous carbonaceous material, flat nozzles being preferably used on the injector or injectors to spread the flame over a large surface of the carbonaceous material in the retort. The injector or injectors are preferable swiveled to their connecting fuel and steam pipes, so that they may be swung back or forth, in order to be under ready control for the purpose of cleaning. The interior of the combined decomposing-retort and combustion-chamber is provided with a series of deflecting-surfaces, K′, formed by a series of salient and re-entering curves or angles, the object of which is to deflect the injected fuel, and the gases generated therefrom, or the steam employed, and cause the same to reverberate through the combined decomposing retort or chamber, and hug the solid or porous carbonaceous material therein, so as to be thoroughly decomposed and consumed, and thereby create an intense heat.

The letter L indicates the air-pipes, entering at the rear or other portion of the furnace and extending through the hottest part of the furnace to the front of the combined decomposing-retort and combustion-chamber, where they terminate in such position that the draft caused by the injected steam will create an induced current of air, which will enter the combined decomposing-retort and combustion-chamber along with the injected steam, and thus assist in the combustion, the air in its passage through the pipes being heated to an intense heat, by which the combustion is greatly intensified.

The connections leading to the injector, as well as the air-pipes, are provided with suitable cocks and valves, by means of which the supply of steam and liquid or subdivided fuel and the air admitted may be controlled.

In order to observe the interior of the combined decomposing-retort and combustion-chamber, and the combustion taking place therein, one or more bull's-eyes may be provided at any convenient point in the furnace for the purpose.

The operation of my invention will be readily understood in connection with the above description, and is as follows: The combined decomposing-retort and combustion-chamber is properly charged with the solid or porous carbonaceous material, which forms an inclined bed therein, as indicated in the drawings. This material being ignited and brought to a white heat, the steam, with or without the liquid or subdivided fuel, is introduced through the injector. The steam and the liquid or subdivided fuel, in an atomized condition, enter the front of the combined decomposing-retort and combustion-chamber, being deflected directly upon the bed of solid or porous carbonaceous material, where the steam is instantaneously decomposed by the oxygen of the steam uniting with the carbonaceous material in the combined decomposing-retort or combustion-chamber at an intense heat, thus converting the steam completely into carbonic oxide and hydrogen gases, the heated air at the same time serving to perfectly consume the gases, creating a most intense heat. The salient and re-entering curves of the combined decomposing-retort check the velocity of the steam, especially when under high pressure, and cause the volume of gases generated alternately to expand and contract in said condenser, so that they cannot escape unconsumed. The gases resulting from the decomposed steam furnish the main and most important heating factor, thus largely reducing the consumption of the fuel.

Having thus fully described my invention, what I claim, and desire to secure by Letters Patent, is—

1. In the production of heat, a process of decomposing water by injecting the same, in a vaporized condition, either with or without the admixture of either liquid or subdivided fuel, into or upon solid or porous carbonaceous material located in a combined decomposing-retort and combustion-chamber constructed for the purpose, whereby mutual decomposition of the water and fuel into hydrogen and carbonic oxide is effected by causing the vaporized water, either alone or in conjunction with the liquid or subdivided fuel, to hug the surface of the solid or porous carbonaceous material, and be brought into intimate contact with the same, substantially as and for the purposes specified.

2. The process of burning liquid or subdivided fuel in conjunction with the gases resulting from the decomposition of water, by atomizing and injecting such fuel, in conjunction with a current of steam, upon a bed of solid or porous carbonaceous material heated to an intense white heat in a suitable combined decomposing-retort and combustion-chamber, whereby the mutual decomposition of the steam and fuel into hydrogen and carbonic oxide is effected by the successive and intimate contact of the steam and the liquid or subdivided fuel upon the solid or porous carbonaceous material in the said combined decomposing-retort and combustion-chamber, and perfect combustion of the resultant gases is effected, and the most intense heat produced, substantially as specified.

3. The process of burning liquid or subdivided fuel by atomizing and injecting the same, by means of a current of steam, upon a bed of carbonaceous material heated to an intense white heat in a combined decomposing-retort and combustion-chamber, and causing it, together with the gases generated, to reverberate over the solid or porous carbonaceous material, so as to bring it and said gases into intimate contact with successive fresh portions of solid or porous carbonaceous material, substantially as specified.

4. The process of burning liquid or subdivided fuel by atomizing and injecting the same upon a bed of solid or porous carbonaceous material heated to an intense white heat in a combined decomposing-retort and combustion-chamber, in conjunction with a current of heated air, and causing the whole to reverberate over and hug the solid or porous carbonaceous material, so as to bring the gases developed into intimate contact with successive fresh portions of solid or porous carbonaceous material, whereby a thorough combustion of the liquid or subdivided fuel is effected and an intense heat produced.

5. In a furnace for burning liquid or subdivided fuel, a combined decomposing-retort and combustion-chamber, having its interior provided with a series of salient and re-entering deflecting-surface to deflect and reverberate the liquid or subdivided fuel and steam, and the gases arising therefrom, and cause the same to come successively into intimate contact with fresh portions of the solid or porous carbonaceous material.

6. In a furnace for burning liquid or subdivided fuel and decomposing steam, a combined decomposing-retort and combustion-chamber adapted to hold solid or porous carbonaceous material, the said combined decomposing-retort and combustion-chamber being made in sections of fire-tiles or other refractory material, whereby it may be located in the furnace without removing the front or any other portion of the same, substantially as specified.

7. The combination, in a furnace for burning liquid or subdivided fuel, of a combined decomposing-retort and combustion-chamber adapted to hold solid or porous carbonaceous material, and provided with a series of reverberating and deflecting surfaces on its interior, and a suitable injector for introducing liquid or subdivided fuel, whereby the gases generated therefrom are caused to hug the surface of the carbonaceous material, substantially as specified.

8. The combination, in a furnace for burning liquid or subdivided fuel, of a combined decomposing-retort and combustion-chamber, adapted to contain solid or porous carbonaceous material, with an atomizing-injector for injecting liquid or subdivided fuel into said combined retort and chamber, and suitable air-passages, whereby heated air may be introduced into the retort and combustion-chamber, in conjunction with the liquid or subdivided fuel and steam, and caused to reverberate over and hug the solid or porous carbonaceous material for the purpose of completing the combustion and intensifying the heat, substantially as set forth.

9. The combination, with the combined decomposing-retort and combustion-chamber, of an injector, whereby atomized or subdivided fuel, in conjunction with a current of steam or air, may be supplied to said retort and combustion-chamber, substantially as specified.

BYRON SLOPER.

Witnesses:
D. P. COWL,
GEO. R. BYINGTON.